(No Model.)

L. PRIDEAUX.
SHAFT OR TONGUE COUPLING.

No. 569,426.  Patented Oct. 13, 1896.

WITNESSES:
P. F. Nagle.
L. Douville.

INVENTOR
Lewis Prideaux
BY
ATTORNEY.

United States Patent Office.

LEWIS PRIDEAUX, OF PHILADELPHIA, PENNSYLVANIA.

SHAFT OR TONGUE COUPLING.

SPECIFICATION forming part of Letters Patent No. 569,426, dated October 13, 1896.

Application filed April 30, 1896. Serial No. 589,632. (No model.)

*To all whom it may concern:*

Be it known that I, LEWIS PRIDEAUX, a citizen of the United States, residing in the city and county of Philadelphia, State of Pennsylvania, have invented a new and useful Improvement in Shaft or Tongue Couplings, which improvement is fully set forth in the following specification and accompanying drawings.

My invention consists of a shaft or tongue coupling composed of a hook which is rigidly attached to the shaft or tongue and adapted to engage with a box of the coupling and oscillate therein, it being also readily removable without displacing the bolt or cross-bar of the box.

It also consists of a spring attached to the coupling, so disposed that it may engage with the box and prevent rattling of the coupling.

Figure 1:
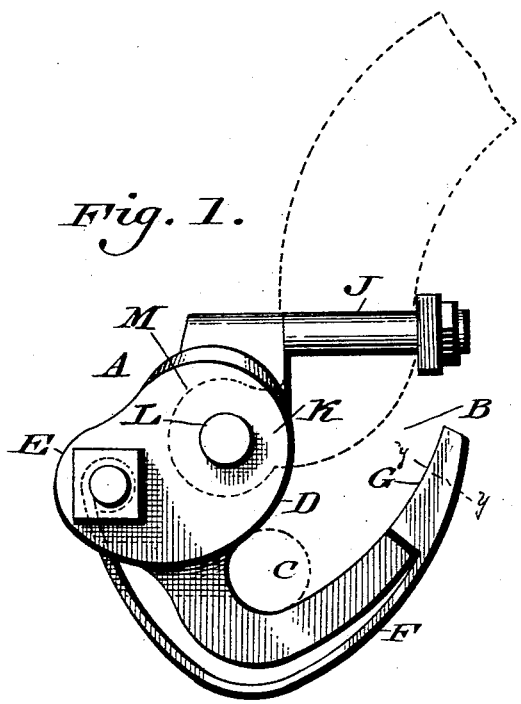
Figure 2:
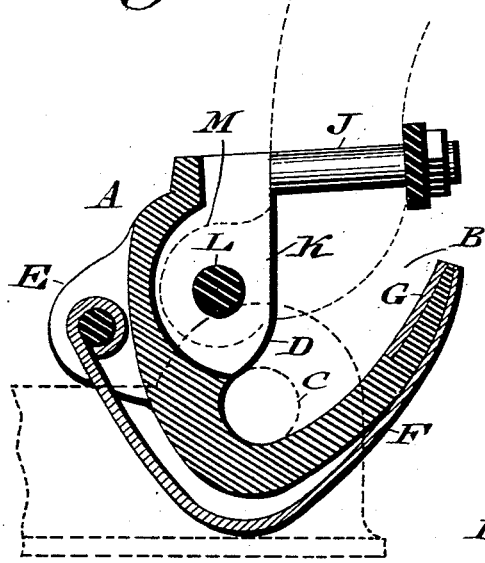
Figure 3:
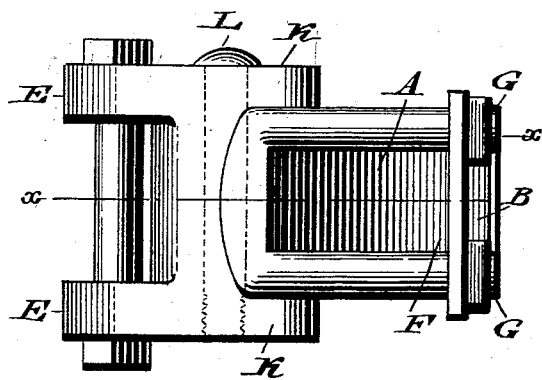
Figure 4:
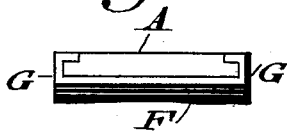

Figure 1 represents a side elevation of a coupling embodying my invention. Fig. 2 represents a vertical section of the same. Fig. 3 represents a top or plan view thereof. Fig. 4 represents a section on line $y$ $y$, Fig. 1.

Similar letters of reference indicate corresponding parts in the several figures.

Referring to the drawings, A designates a downwardly-curved hook which is rigidly connected with a thill-iron on the shaft or tongue of a vehicle, the nose of said hook projecting forwardly and forming the throat B above the end of the same, thus permitting the hook to be fitted on the bolt C, forming part of the axle-clip, the bend of the hook forming the seat D for said bolt, whereby the shaft or tongue is coupled with the vehicle, and it may readily oscillate in the box without displacement. Attached to ears E on the body of the hook is a spring F, which extends beneath the hook to the front of the same so as to engage with the wall of the box, and thus impart pressure to the coupling and prevent rattling of the same in said box. When the shaft or tongue is turned downwardly, the throat is in such position that the hook may be removed from the bolt and box by lifting it clear of said bolt. The spring is independent of the hook and may rotate on its bearings so as to oscillate in the box, due to the motions of the shaft or tongue and vehicle, and thus prevent straining and breaking of said spring. The forward end of the spring is formed with lips G, which freely embrace the adjacent portion of the hook, thus preventing lateral displacement of the spring and retaining it in position.

The body of the hook is provided with bolts or clips J and ears K, said clips being adapted to enter the shaft or tongue and be secured thereto by nuts or heads riveted thereon. The ears K are on the side of the body to receive the bolt L, which is passed through the eye M on the rear end of said shaft or tongue, thus firmly connecting the latter with the coupling.

Having thus described my invention, what I claim as new, and desire to secure by Letters Patent, is—

1. In a shaft or tongue coupling a hook member having a body with a hook proper and provided with ears, and a spring pivoted to said ears, and having an end freely embracing said hook.

2. In a coupling, a hook member having a body with a hook proper, and a spring connected with said body, and provided with lips freely embracing the adjacent portion of said hook, said parts being combined, substantially as and for the purpose set forth.

3. In a coupling, a body provided with the hook A, the clips J and the ears K, said parts being combined substantially as described.

4. In a shaft-coupling, a member having a body with the ears M adapted to receive a bolt, the clips J adapted to be secured to the shaft, and the ears E, and a spring pivotally secured to said ears and having lips at its free end embracing said hook.

5. A hook, a body carrying the same, attaching devices, an antirattling spring, which latter is provided with lips which freely embrace the body portion of said hook and ears holding said spring, substantially as described.

LEWIS PRIDEAUX.

Witnesses:
JOHN A. WIEDERSHEIM,
J. K. G. GAVITT.